(12) United States Patent
Lien et al.

(10) Patent No.: US 8,196,875 B2
(45) Date of Patent: Jun. 12, 2012

(54) SUPPORT STAND WITH INTERMEDIATE CONNECTING ASSEMBLY

(75) Inventors: Chih-Huang Lien, Miao-Li County (TW); Zheng-Yong Tang, Shenzhen (CN); Hai-Ping Jiang, Shenzhen (CN)

(73) Assignee: Chimei Innolux Corporation, Miaoli County (TW)

( * ) Notice: Subject to any disclaimer, the term of this patent is extended or adjusted under 35 U.S.C. 154(b) by 303 days.

(21) Appl. No.: 12/644,623

(22) Filed: Dec. 22, 2009

(65) Prior Publication Data
US 2010/0155546 A1 Jun. 24, 2010

(30) Foreign Application Priority Data
Dec. 23, 2008 (CN) .................. 2008 1 0306472

(51) Int. Cl.
*F16L 3/00* (2006.01)
*G06F 1/16* (2006.01)
(52) U.S. Cl. ............ 248/121; 248/284.1; 248/371; 248/917; 248/919; 248/922; 361/679.02
(58) Field of Classification Search .......... 248/121, 248/370, 371, 284.1, 917, 919, 922, 923; 361/679.02
See application file for complete search history.

(56) References Cited

U.S. PATENT DOCUMENTS

| | | | | |
|---|---|---|---|---|
| 6,672,553 B1 * | 1/2004 | Lin | ............. | 248/276.1 |
| 6,769,657 B1 * | 8/2004 | Huang | ............. | 248/278.1 |
| 7,404,233 B2 * | 7/2008 | Lu et al. | ............. | 16/302 |
| 7,431,254 B2 * | 10/2008 | Cheng | ............. | 248/292.12 |
| 7,766,288 B2 * | 8/2010 | Kim et al. | ............. | 248/176.1 |
| 7,789,363 B2 * | 9/2010 | Duan | ............. | 248/284.1 |
| 8,061,663 B2 * | 11/2011 | Wang et al. | ............. | 248/162.1 |
| 2010/0282923 A1 * | 11/2010 | Wang et al. | ............. | 248/158 |

FOREIGN PATENT DOCUMENTS
TW 488510 5/2002
TW M300950 11/2006
* cited by examiner

*Primary Examiner* — Anita M King
(74) *Attorney, Agent, or Firm* — Bacon & Thomas, PLLC

(57) ABSTRACT

An exemplary support stand includes a base, a connecting assembly, a support bracket, two first hinge assemblies, and two second hinge assemblies. The connecting assembly is arranged between the base and the support bracket. The first hinge assemblies rotatably connect the connecting assembly to the base. The second hinge assemblies rotatably connect the connecting assembly to the support bracket. The connecting assembly comprises a connecting bracket and a connecting plate partially received in the connecting bracket. The connecting plate, the connecting bracket, one first hinge assembly, and one second hinge assembly form a quadrangle.

20 Claims, 2 Drawing Sheets

SUPPORT STAND WITH INTERMEDIATE CONNECTING ASSEMBLY

BACKGROUND

1. Technical Field

The present disclosure generally relates to displays, and particularly, to a support stand for a display device.

2. Description of Related Art

Flat-panel displays, such as liquid crystal displays, offer advantages over cathode ray tube displays, such as reduced size, smaller weight, and better image quality. A four-bar linkage is often needed in the support stand of a flat-panel display to adjust the viewing angle and height.

A frequently used support stand includes a base plate, a supporting bracket, a connecting bracket, two first hinge assemblies, two second hinge assemblies, four linkages, and a resilient member. The first hinge assemblies connect the base plate and the supporting bracket, and the second hinge assemblies connect the supporting bracket and the connecting bracket. Opposite ends of the resilient member connect to the base plate and the connecting bracket respectively, and the resilient member provides a force to balance the weight of the display. Opposite ends of each linkage also connect to the base plate and the connecting bracket respectively. The resilient member, the supporting member, and the four linkages are all arranged between the base plate and the connecting bracket, thus occupying considerable space and increasing the size of the support stand.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views, and all the views are schematic.

DETAILED DESCRIPTION

Figure 1:
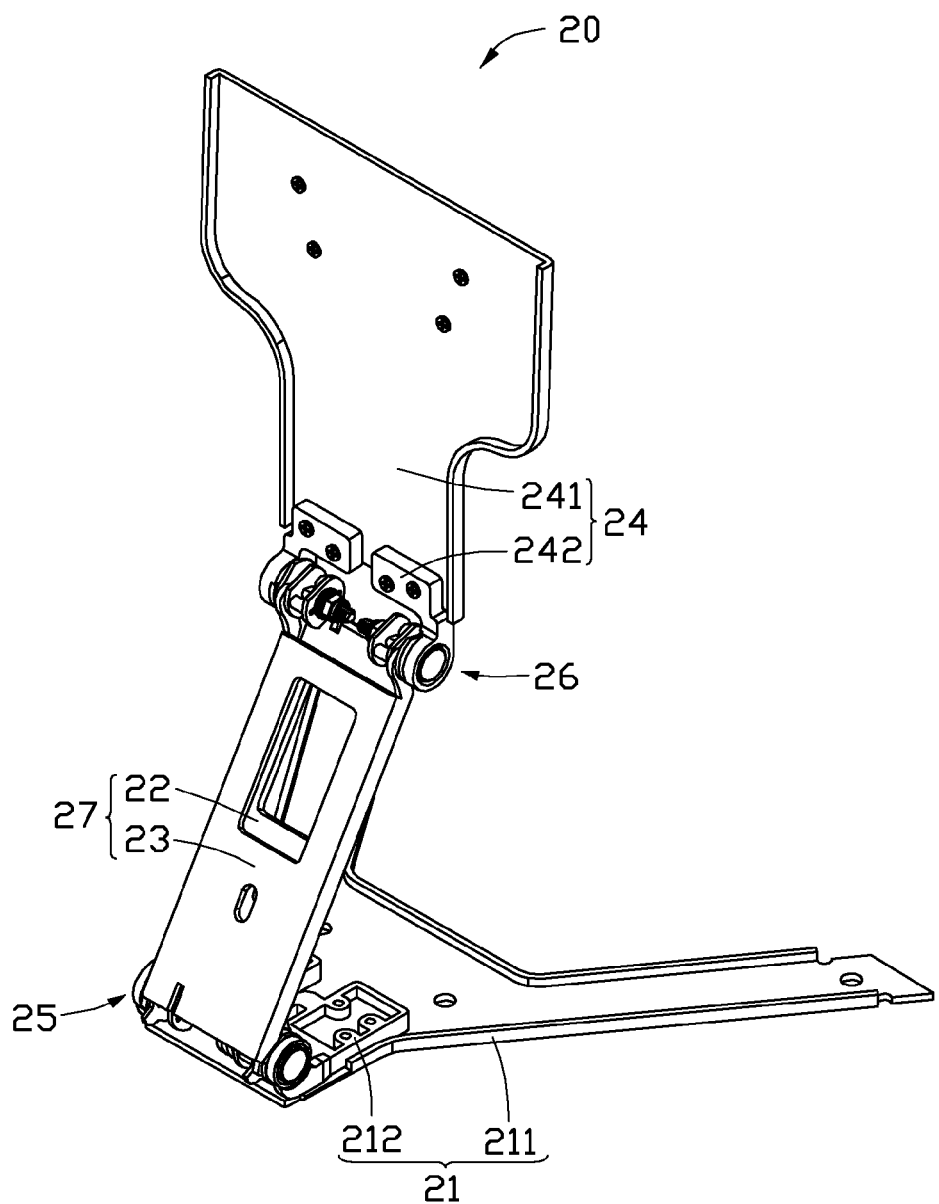
FIG. 1 is an assembled, isometric view of a support stand of an exemplary embodiment of the present invention, the support stand including a base, a connecting assembly, a support bracket, two first hinge assemblies, and two second hinge assemblies.
Figure 2:
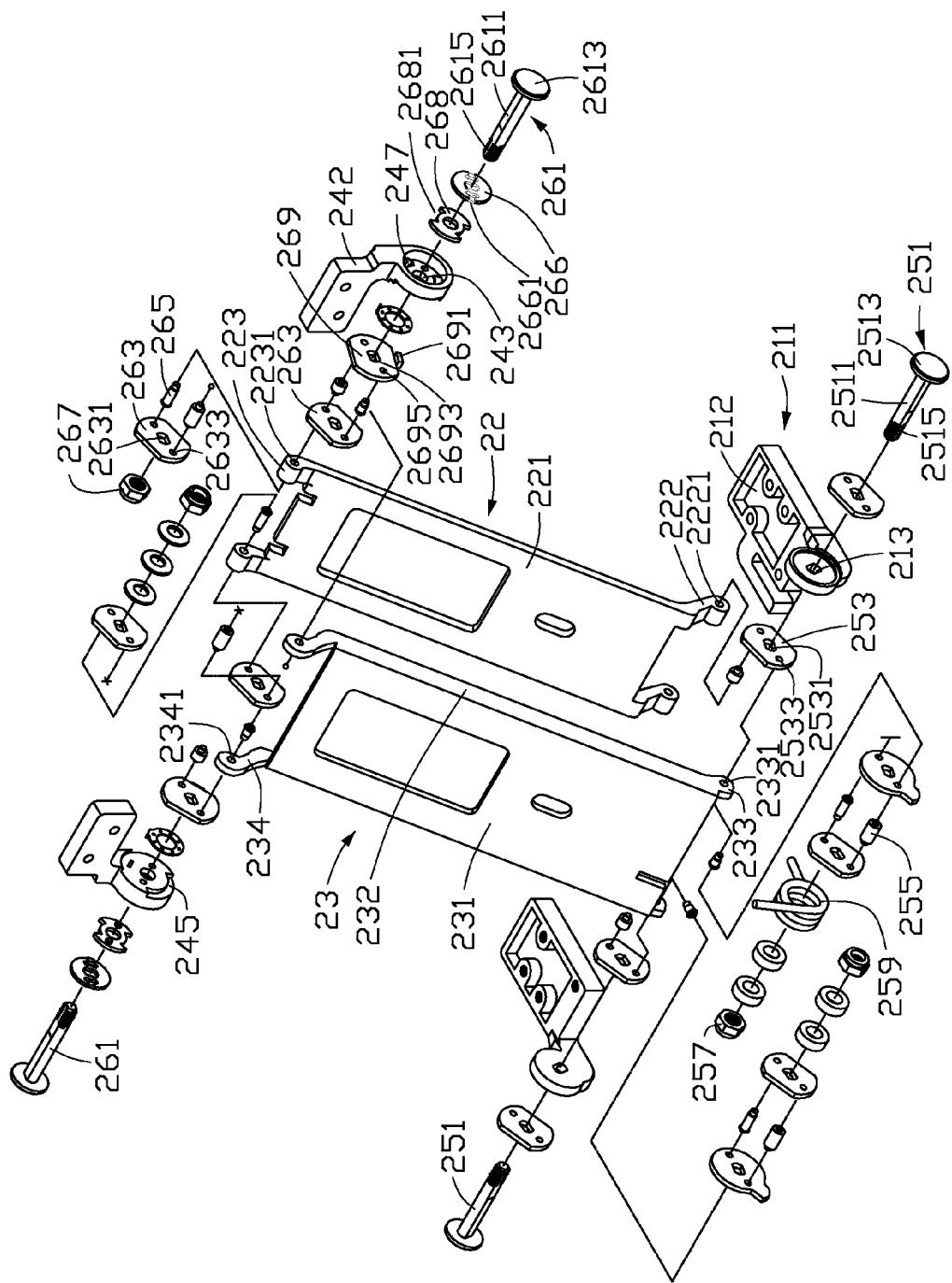
FIG. 2 is an exploded, isometric view of part of the support stand of FIG. 1.

Referring to FIGS. 1 and 2, the present support stand 20 for a display includes a base 21, a connecting assembly 27, a support bracket 24, two first hinge assemblies 25, and two second hinge assemblies 26. The display can be any of various kinds of displays, such as a flat-panel display. The connecting assembly 27 is arranged between the base 21 and the support bracket 24. The first hinge assemblies 25 rotatably connect the connecting assembly 27 to the base 21. The second hinge assemblies 26 rotatably connect the connecting assembly 27 to the support bracket 24.

The base 21 includes a support plate 211, and two connecting portions 212 connected to the support plate 211. Each connecting portion 212 defines a connecting hole 213, with the connecting holes 213 being opposite to each other and substantially sharing a same axis. The connecting portions 212 are fixed with the support plate 211 by a fastener (not shown), such as a screw.

The connecting assembly 27 includes a connecting plate 22 partially received in a connecting bracket 23.

The connecting plate 22 includes a main body 221, two first support arms 222 extending from one end of the main body 221, and two second support arms 223 extending from another end of the main body 221. The first support arms 222 are opposite each other and are arranged at one side of the main body 221, and the second support arms 223 are opposite each other and are arranged at another side of the main body 221. Each first support arm 222 defines a shaft hole 2221, and each second support arm 223 defines a shaft hole 2231.

The connecting bracket 23 includes a base body 231, and two sidewalls 232 on opposite sides of the base body 231. The base body 231 is wider than the main body 221 of the connecting plate 22. Each sidewall 232 includes a first connecting arm 233 and a second connecting arm 234. The first connecting arm 233 and the second connecting arm 234 are arranged at opposite ends of the sidewall 232. The first connecting arms 233 are opposite each other and are arranged on one side of base body 231. The second connecting arms 234 are opposite each other and are arranged on the other side of the base body 231. Each first connecting arm 233 defines a shaft hole 2331, and each second connecting arm 234 defines a shaft hole 2341.

The support bracket 24 includes a fixing plate 241 and two fixing arms 242 connected to the fixing plate 241. Each fixing arm 242 defines a connecting hole 243, a restricting slot 245, and a receiving hole 247.

Each first hinge assembly 25 includes a first shaft 251, a plurality of spacers 253, a plurality of connecting pins 255, and a fastener 257. The first shaft 251 includes a shaft portion 2511 and a head 2513 at one end of the shaft portion 2511. The shaft portion 2511 has a threaded portion 2515 located far away from the head 2513. Each spacer 253 defines a shaft hole 2531, and two connecting holes 2533 arranged at opposite sides of the shaft hole 2531. In the illustrated embodiment, each first hinge assembly 25 has four spacers 253 and four connecting pins 255. In addition, one of the first hinge assemblies 25 also includes a torsion spring 259. In other embodiments, the number of first hinge assemblies 25 may instead be one, or more than two, based on the structure of the support stand 20. Correspondingly, the number of spacers 253 may instead be four, or more than eight.

Each second hinge assembly 26 includes a second shaft 261, a plurality of spacers 263, a plurality of connecting pins 265, a fastener 267, a first restricting member 266, a second restricting member 268, and a third restricting member 269. The second shaft 261 includes a shaft portion 2611, and a head 2613 at one end of the shaft portion 2611. The shaft portion 2611 has a threaded portion 2615 located far away from the head 2613. Each spacer 263 defines a shaft hole 2631, and two connecting holes 2633 arranged at opposite sides of the shaft hole 2631. The first restricting member 266 forms a protrusion 2661, and the second restricting member 268 defines a latching slot 2681 in which the protrusion 2661 is received. The third restricting member 269 includes a bent portion 2691 received in the restricting slot 245 of the fixing arm 242, thereby limiting a rotation angle of the flat-panel display. The third restricting member 269 also defines a shaft hole 2693, and two connecting holes 2695 arranged at opposite sides of the shaft hole 2693. In the illustrated embodiment, each second hinge assembly 26 has two spacers 263 and four connecting pins 265. In other embodiments, the number of second hinge assemblies 26 may instead be one, or more than two, depending on the structure of the support stand 20. Correspondingly, the number of spacers 263 may instead be two, or more than four.

During assembly of the base 21, the first hinge assemblies 25, and the connecting assembly 27, one first shaft 251 of one first hinge assembly 25 extends through one spacer 253, one connecting hole 213 of one connecting portion 212 of the base 21, the other three other spacers 253, and the torsion spring 259. The fastener 257 engages with the threaded portion 2515 of the first shaft 251. One connecting pin 255 extends through the shaft hole 2221 of one first support arm 222 of the connecting plate 22 and the connecting hole 2533 of the spacer 253 adjacent to the connecting portion 212. Another connecting pin 255 extends through the shaft hole 2331 of one first connecting arm 233 and the connecting hole 2533 of the spacer 253 adjacent to the connecting portion 212. The other two connecting pins 255 are both arranged between the other two spacers 253. Opposite ends of each of these two connecting pin 255 are received in one connecting hole 2533 of the two spacers 253, respectively. The other first hinge assembly 25 is connected with the base 21 and the connecting assembly 27 in much the same way as described above. For each first hinge assembly 25, one end of the torsion spring 259 resists the base 21, and the other end is clamped between the connecting plate 22 and the connecting bracket 23. The torsion spring 259 thereby provides force that balances the weight of the flat-panel display (not shown) connected with the support bracket 24.

During assembly of the support bracket 24, the second hinge assemblies 26, and the connecting assembly 27, one second shaft 261 of one second hinge assembly 26 extends through one first restricting member 266, one second restricting member 268, the shaft hole 243 of one fixing arm 242, one third restricting member 269, and the spacers 263. The fastener 267 engages with the threaded portion 2615 of the second shaft 261. Two connecting pins 265 are arranged between the third restricting member 269 and one spacer 263. Opposite ends of each of these connecting pins 265 are received in one connecting hole 2631 of the spacer 263 and one connecting hole 2691 of the third restricting member 269, respectively. The second restricting member 268 is received in the receiving hole 247 of the fixing arm 242. The latching slot 2681 of the second restricting member 268 receives the protrusion 2661 of the first restricting member 266, and the bent portion 2691 of the third restricting member 269 is received in the restricting slot 245 of the fixing arm 242. The other second hinge assembly 26 is connected with the support bracket 25 and the connecting assembly 27 in the same way as described above.

In use, when force is applied on a flat-panel display connected with the support bracket 24, the support bracket 24 rotates relative to the connecting assembly 27 around the second shafts 261 of the second hinge assemblies 26, and both the support bracket 24 and the connecting assembly 27 rotate relative to the base 21 around the first shafts 251 of the first hinge assemblies 25. The spacers 253 of one first hinge assembly 25, the spacers 263 of one second hinge assembly 26, the connecting plate 22, and the connecting bracket 23 form a quadrangle. Similarly, the spacers 253 of the other first hinge assembly 25, the spacers 263 of the other second hinge assembly 26, the connecting plate 22, and the connecting bracket 23 form another quadrangle. Thereby, a desired angle between the support bracket 24 and the base 21 is maintained, and the flat-panel display remains at a stable viewing angle relative to the base 21.

The connecting pins 255 of the first hinge assembly 25 are arranged between the spacers 253, and the connecting pins 265 of the second hinge assembly 26 are arranged between spacers 263. Therefore, the main body 221 of the connecting plate 22 can be received between the two sidewalls 232 of the connecting bracket 23. The support stand 20 can have a relatively small thickness. The first support arms 222 of the connecting plate 22 and the second connecting arms 234 of the connecting bracket 23 are bent away from the main body 221 and the base body 231. Therefore, the space between the connecting plate 22 and the connecting bracket 23 can be decreased.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A support stand, comprising:
   a base;
   a connecting assembly comprising a connecting bracket and a connecting plate partially received in the connecting bracket;
   a support bracket;
   at least one first hinge assembly connecting the base, one end of the connecting bracket, and one end of the connecting plate; and
   at least one second hinge assembly connecting the support bracket, another end of the connecting bracket, and another end of the connecting plate;
   wherein the at least one first hinge assembly comprises at least one spacer and at least two connecting pins arranged on two sides of the at least one spacer, and the at least two connecting pins and the at least one spacer connect the connecting plate and the connecting bracket to the base.

2. The support stand of claim 1, wherein the at least one second hinge assembly comprises at least one spacer and at least two connecting pins arranged on two sides of the at least one spacer, and the at least two connecting pins and the at least one spacer connect the connecting plate and the connecting bracket to the support bracket.

3. The support stand of claim 2, wherein the one end of the connecting plate comprises a first support arm connecting with one of the connecting pins of the at least one first hinge assembly, and the one end of the connecting bracket comprises a first connecting arm connecting with another one of the connecting pins of the at least one first hinge assembly.

4. The support stand of claim 3, wherein the another end of the connecting plate comprises a second support arm connecting with one of the connecting pins of the at least one second hinge assembly, and the another end of the connecting bracket comprises a second connecting arm connecting with another one of the connecting pins of the at least one second hinge assembly.

5. The support stand of claim 4, wherein the connecting plate further comprises a main body, and the first support arm and the second support arm are arranged on opposite sides of the main body.

6. The support stand of claim 5, wherein the connecting bracket further comprises a base body and two sidewalls on opposite sides of the base body, and the first connecting arm and the second connecting arm are formed at opposite ends of one of the sidewalls.

7. The support stand of claim 6, wherein the at least one first hinge assembly further comprises a first shaft, the first shaft comprises a first shaft portion, a first head formed at an end of the first shaft portion, and a first threaded portion formed at another end of the first shaft portion, the at least one spacer of the at least one first hinge assembly defines a first shaft hole and two first connecting holes arranged at opposite sides of the first shaft hole, the base comprises a support plate and at least one connecting portion connected to the support plate, the at least one connecting portion defines a connecting hole, the first shaft extends through the connecting hole of the at least one connecting portion and the first shaft hole, the first threaded portion engages with a first fastener, and the two connecting pins of the at least one first hinge assembly engage in the two first connecting holes.

8. The support stand of claim 7, wherein the at least one second hinge assembly further comprises a second shaft, the second shaft comprises a second shaft portion, a second head formed at an end of the second shaft portion, and a second threaded portion formed at another end of the second shaft portion, the at least one spacer of the at least one second hinge assembly defines a second shaft hole and two second connecting holes arranged at opposite sides of the second shaft hole, the support bracket comprises a fixing plate and at least one fixing arm connected to the fixing plate, the at least one fixing arm defines a connecting hole, the second shaft extends through the connecting hole of the at least one fixing arm and the second shaft hole, the second threaded portion engages with a second fastener, and the two connecting pins of the at least one second hinge assembly engage in the two second connecting holes.

9. The support stand of claim 1, wherein the at least one first hinge assembly comprises two first hinge assemblies, one of which further comprises a torsion spring, and one end of the torsion spring resists the base, and the other end of the torsion spring is between the connecting plate and the connecting bracket.

10. The support stand of claim 1, wherein the at least one first hinge assembly further comprises a first shaft, and the first shaft comprises a shaft portion and a head formed at an end of the shaft portion.

11. The support stand of claim 10, wherein the at least one second hinge assembly further comprises a second shaft, and the second shaft comprises a shaft portion and a head formed at an end of the shaft portion.

12. A support stand, comprising:
a base;
a connecting assembly;
a support bracket;
at least one first hinge assembly connecting the base and the connecting assembly; and
at least one second hinge assembly connecting the connecting assembly and the support bracket;
wherein the connecting assembly comprises a connecting bracket and a connecting plate partially received in the connecting bracket; and the connecting plate and the connecting bracket support the support bracket; and
the at least one first hinge assembly comprises at least one spacer and at least two connecting pins arranged on two sides of the at least one spacer; and the at least two connecting pins and the at least one spacer connect the connecting plate and the connecting bracket to the base.

13. The support stand of claim 12, wherein the at least one second hinge assembly comprises at least one spacer and at least two connecting pins arranged on two sides of the at least one spacer, and the at least two connecting pins and the at least one spacer connect the connecting plate and the connecting bracket to the support bracket.

14. The support stand of claim 13, wherein the one end of the connecting plate comprises a first support arm connecting with one of the connecting pins of the at least one first hinge assembly, and the one end of the connecting bracket comprises a first connecting arm connecting with another one of the connecting pins of the at least one first hinge assembly.

15. The support stand of claim 14, wherein the another end of the connecting plate comprises a second support arm connecting with one of the connecting pins of the at least one second hinge assembly, and the another end of the connecting bracket comprises a second connecting arm connecting with another one of the connecting pins of the at least one second hinge assembly.

16. The support stand of claim 15, wherein the connecting plate further comprises a main body, and the first support arm and the second support arm are arranged on opposite sides of the main body.

17. The support stand of claim 16, wherein the connecting bracket further comprises a base body and two sidewalls on opposite sides of the base body, wherein and the first connecting arm and the second connecting arm are formed at opposite ends of one of the sidewalls.

18. The support stand of claim 17, wherein the at least one first hinge assembly further comprises a first shaft, the first shaft comprises a first shaft portion, a first head formed at an end of the first shaft portion, and a first threaded portion formed at another end of the first shaft portion, the at least one spacer of the at least one first hinge assembly defines a first shaft hole and two first connecting holes arranged at opposite sides of the first shaft hole, the base comprises a support plate and at least one connecting portion connected to the support plate, the at least one connecting portion defines a connecting hole, the first shaft extends through the connecting hole of the at least one connecting portion and the first shaft hole, the first threaded portion engages with a first fastener, and the two connecting pins of the at least one first hinge assembly engage in the two first connecting holes.

19. The support stand of claim 18, wherein the at least one second hinge assembly further comprises a second shaft, the second shaft comprises a second shaft portion, a second head formed at an end of the second shaft portion, and a second threaded portion formed at another end of the second shaft portion, the at least one spacer of the at least one second hinge assembly defines a second shaft hole and two second connecting holes arranged at opposite sides of the second shaft hole, the support bracket comprises a fixing plate and at least one fixing arm connected to the fixing plate, the at least one fixing arm defines a connecting hole, the second shaft extends through the connecting hole of the at least one fixing arm and the second shaft hole, the second threaded portion engages with a second fastener, and the two connecting pins of the at least one second hinge assembly engage in the two second connecting holes.

20. The support stand of claim 12, wherein the at least one first hinge assembly comprises two first hinge assemblies, one of which further comprises a torsion spring, and one end of the torsion spring resists the base, and the other end of the torsion spring is between the connecting plate and the connecting bracket.

* * * * *